United States Patent [19]

Chamberlin et al.

[11] 4,144,211
[45] Mar. 13, 1979

[54] NOVEL COMPLEXES OF POLYOXAZOLINES OR POLYOXAZINES AND HALOGENS, INTERHALOGENS OR PSEUDO-HALOGENS AND PROCESS FOR PREPARING SAME

[75] Inventors: Thomas A. Chamberlin; Sonia W. Bangs, both of Midland, Mich.

[73] Assignee: The Dow Chemical Company, Midland, Mich.

[21] Appl. No.: 830,529

[22] Filed: Sep. 6, 1977

[51] Int. Cl.² .................. C08L 79/04; C08G 73/06
[52] U.S. Cl. .................. 260/29.2 R; 260/307 R; 528/403; 528/404; 544/88; 424/78
[58] Field of Search ............ 260/2 R, 78 SC, 29.2 R; 424/78, 150; 528/403, 404

[56] References Cited

U.S. PATENT DOCUMENTS

| | | | |
|---|---|---|---|
| 3,483,141 | 12/1969 | Litt et al. | 260/2 R |
| 3,549,306 | 12/1970 | Friedlander et al. | 260/78 SC |
| 3,607,798 | 9/1971 | Hirsch | 260/78 SC |
| 3,821,125 | 6/1974 | Saegusa et al. | 528/404 |
| 3,833,521 | 9/1974 | Karbstein et al. | 528/404 |
| 3,911,107 | 10/1975 | Krezanoski | 424/78 |
| 4,004,996 | 1/1977 | Kollonitsch | 260/78 SC |

*Primary Examiner*—Wilbert J. Briggs, Sr.
*Attorney, Agent, or Firm*—L. Wayne White

[57] ABSTRACT

Novel solid complexes of 2-oxazoline and 2-oxazine polymers and halogens, interhalogens or pseudo-halogens are prepared by contacting a poly-2-oxazoline or poly-2-oxazine whose backbone comprises a plurality of ring-opened units of an oxazoline or oxazine monomer of the general formula

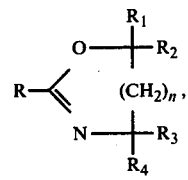

wherein R and $R_1$–$R_4$ are each independently hydrogen, alkyl, aralkyl, phenyl or inertly-substituted phenyl and n is zero or one with a halogen, interhalogen or pseudo-halogen. The complexes are soluble in a variety of conventional solvents (e.g., water, methylene chloride, acetonitrile, methanol, tetrahydrofuran and isopropanol).

14 Claims, No Drawings

NOVEL COMPLEXES OF POLYOXAZOLINES OR POLYOXAZINES AND HALOGENS, INTERHALOGENS OR PSEUDO-HALOGENS AND PROCESS FOR PREPARING SAME

BACKGROUND OF THE INVENTION

1. Field of the Invention:

This invention pertains to a novel class of complexes of 2-oxazoline or 2-oxazine polymers and halogens, interhalogens or pseudo-halogens, a process for preparing the complexes, and utility for the complexes.

2. Prior Art:

In U.S. Pat. No. 3,133,904, Tousignant et al. describe the preparation of complexes of iodine or bromine and N-substituted cyclic carbamates. The polymers of the cyclic carbamates used therein possessed intact oxazolidinone rings.

Various iodine complexes have been formed from iodine and poly(vinylpyrrolidone). Cf. Leone et al., German Pat. No. 2,443,530; Mundipharma, Austrian Pat. No. 320,827. These complexes were allegedly useful as disinfectants.

The prior art is void, insofar as we are aware, of any other attempts to prepare complexes between halogens and poly(2-oxazolines).

SUMMARY OF THE INVENTION

We have discovered a novel class of solid complexes comprising (a) a poly-2-oxazoline or poly-2-oxazine, and (b) a halogen, interhalogen or pseudo-halogen and a novel process for preparing same. Said poly-2-oxazoline or poly-2-oxazine is a homopolymer or interpolymer whose backbone comprises a plurality of ring-opened units of a 2-oxazoline or 2-oxazine monomer corresponding to the formula:

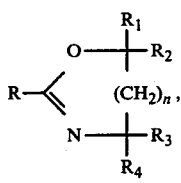

wherein R and $R_1$–$R_4$ are each independently hydrogen, alkyl, aralkyl, phenyl or inertly-substituted phenyl and n is zero or one. The molecular weight of said polymers may vary, but those with weights up to about 500,000 are normally used. The novel process comprises reacting by contacting said halogen, interhalogen or pseudo-halogen with said poly-2-oxazoline or poly-2-oxazine in a substantially inert, non-aqueous, organic liquid solvent. The complexes are normally soluble in a variety of conventional solvents, including water, and some serve as excellent sanitizing agents. When dissolved, it appears that the complexed halogen retains its chemical activity although the complexes themselves are generally quite stable. Thus, the dangers usually associated with the handling of volatile halogens (e.g., $Br_2$) are substantially diminished. The complexes provide an easy way to handle such volatile compounds, but do not rob the halogens of their useful properties. The complexes also increase the solubility of the halogens in various solvents in which they normally demonstrate low solubility. For example, an iodine/poly(2-ethyl-2-oxazoline) complex greatly increased the solubility of iodine in water.

DETAILED DESCRIPTION OF THE INVENTION

The poly-2-oxazolines are known compounds which are typically prepared with the aid of cationic catalysts from 2-oxazoline monomers corresponding to the formula:

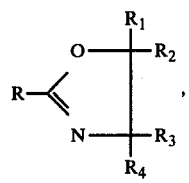

wherein R and $R_1$–$R_4$ are each independently hydrogen, alkyl, aralkyl, phenyl or inertly-substituted phenyl. Cf. John A. Frump, *Chemical Reviews*, Vol. 71, No. 5, 483 (1971) at pages 495–6 and W. Seeliger et al., *Angew. Chem. Internat. Edit.*, Vol. 5, No. 10, 875 (1966) at page 880.

Litt et al. teach in U.S. Pat. No. 3,483,141 that said polymers may be prepared by heating the monomers in the presence of a catalyst selected from the group consisting of alkyl halides, boron-fluorine compounds, antimony-fluorine compounds, strong acids and salts of strong acids.

The poly-2-oxazines are likewise a known class of compounds and may often be prepared from 2-oxazine monomers corresponding to the formula

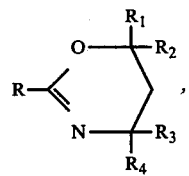

in the same manner as the poly-2-oxazolines above. Cf. Seelinger et al., supra at page 882; Litt et al., supra.

The instant polymers contain N-acylethylenimine or N-acyltrimethylenimine units or substituted such units. The structure of the homopolymer when the monomer is 2-ethyl-2-oxazoline may be illustrated as follows:

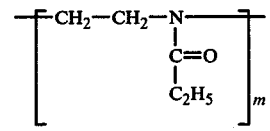

Any member(s) of these known classes of poly-2-oxazolines and poly-2-oxazines may be used. Examples of suitable monomers from which the polymers may be prepared include 2-H-2-oxazoline, 2-methyl-2-oxazoline, 2-ethyl-2-oxazoline, 2-propyl-2-oxazoline, 2-phenyl-2-oxazoline, 2-ethyl-4-methyl-2-oxazoline, 2-ethyl-5-methyl-2-oxazoline, 2-ethyl-5,5-dimethyl-2-oxazoline, 2-H-2-oxazine, 2-methyl-2-oxazine, 2-ethyl-2-oxazine, and the like, and combinations thereof. The preferred monomers are those wherein $R_1$–$R_4$ are each hydrogen and R is hydrogen, phenyl or lower alkyl ($C_1$–$C_4$), with 2-ethyl-2-oxazoline as the monomer of choice. The molecular weight of the polymer may vary, but those with weights up to about 500,000 are normally used.

The polymers are complexed with a halogen, interhalogen or pseudo-halogen, preferably a halogen or interhalogen and more preferably iodine or bromine.

The halogens are a known class of compounds consisting of fluorine, chlorine, bromine and iodine. Bromine and iodine are the most preferred halogens for use in this invention.

The interhalogens are a known class of inorganic compounds, consisting of binary and ternary combinations of a heavier halogen atom bound to an odd number of the lighter halogen atom. The interhalogens herein correspond to the formula $XX'_n$, wherein X and X' are F, Cl, Br or I, n is an odd integer and X' is the lighter halogen atom when n is greater than one. Cf. Cotton and Wilkinson, "Advanced Inorganic Chemistry," 3rd Edit. (1972) at page 481–485, and Gould, "Inorganic Reactions and Structure," 2nd Edit. (1962) at page 214. Examples of such interhalogens include BrCl, ICl, ICl$_3$, IBr, ClF, BrF$_3$, IF$_5$, IF$_7$, BrF, and the like. The most preferred interhalogen is bromine chloride, BrCl.

The pseudo-halogens are likewise a known class of compounds containing carbon-nitrogen bonds. Cf. Cotton and Wilkinson, supra, at page 297. The most common pseudo-halides are cyanide, cyanate and thiocyanate compounds. The analogies to the halogens are seen as most appropriate in the case of cyanogen, $(CN)_2$.

The pseudo-halogens of choice are the binary or symmetrical pseudo-halogens. The more preferred pseudo-halogens contain at least two cyano or thiocyano groups. The most preferred pseudo-halogens are cyanogen or thiocyanogen.

A convenient process for preparing the novel complexes comprises reacting by contacting said halogen, interhalogen or pseudo-halogen and said poly-2-oxazoline or poly-2-oxazine in a substantially non-aqueous organic solvent(s). The complexes are normally obtained as a solution in the solvent. If the solid complex is desired, the solvent is stripped off by conventional means. Suitable solvents are those which dissolve the polymer yet do not react with the halogen, interhalogen or pseudo-halogen. Examples of suitable solvents include halogenated hydrocarbons (e.g., chloroform, methylene chloride, ethylene dichloride, 1,1,1-trichloroethane, etc.); ethers (e.g., furan, tetrahydrofuran, diethyl ether, etc.); acetonitrile and other inert aprotic solvents. The preferred solvent is methylene chloride.

As another aspect of this invention, the formation of such complexes serves as an excellent means of recovery of a halogen, interhalogen or pseudo-halogen from a substantially non-aqueous organic stream.

The stoichiometry of the reactants in the novel complexes varies from about two or more of the oxazoline or oxazine mer units per molecule of halogen, interhalogen or pseudo-halogen. A "saturated" halogen content normally occurs in a ratio of one halogen molecule (e.g., $I_2$ or $Br_2$) per about two to about six of the oxazoline or oxazine mer units.

Generally, the dry complexes are colored solids which are soluble in water, methylene chloride, acetonitrile, methanol, tetrahydrofuran, isopropanol or other conventional solvents. This invention includes the complexes per se and various solutions thereof. As noted above, the solutions of the complexes appear to have more halogen, etc. chemically available than would have been expected for the normal solubility of the halogen, etc. in the solvent. Aqueous solutions of the complexes comprising $I_2$ or $Br_2$ are of particular interest because of their utility as sanitizing agents and oxidative properties.

Particularly useful as sanitizing agents are the aqueous solutions of iodine/poly(2-oxazoline) complexes, since the solubility of iodine in water is greatly multiplied thereby. The aqueous solution of an iodine/poly(2-ethyl-2-oxazoline) complex is the solution of choice.

The following examples further illustrate the invention.

EXAMPLE 1

A mixture of 99.0 g of a poly(2-ethyl-2-oxazoline) having a molecular weight of 94,000 and 63.45 g of iodine was dissolved in about 500 ml of methylene chloride. After dissolution, the dark solution was poured into a pyrex dish and the solvent allowed to evaporate overnight. Final devolatilization was carried out at 70° C. at about 30 mm Hg for 4 hours in a vacuum oven. The solid complex thus obtained was cracked using liquid nitrogen, yielding 142.58 g of a dark granular material. The product contained 30.6 percent iodine, by weight, and had a molar ratio of 2-ethyl-2-oxazoline monomer to iodine of 5.4. The amount of iodine in the product was confirmed by neutron activation analysis (27.3 percent). Use of the complex increased the solubility of iodine over 168 times its normal solubility in water at room temperature.

EXAMPLE 2

A mixture of 3.81 g of iodine and 2.97 g of poly(2-ethyl-2-oxazoline) having a molecular weight of 500,000 was dissolved in methylene chloride and transferred to a rotary evaporator where the volatiles were removed overnight at room temperature and a pressure of about 50 mm Hg. The flask with product was subsequently heated on a steam bath for one hour with nitrogen gas passing rapidly over the contents and out to drive off any uncomplexed iodine. The resulting complex (4.60 g) had molar ratio of 2-ethyl-2-oxazoline monomer to iodine of 5.9. The product was analyzed by nuclear magnetic resonance, infrared and ultraviolet spectroscopy.

EXAMPLE 3

A poly(2-ethyl-2-oxazoline) (19.80g) having a molecular weight of 92,000 was dissolved in 100 ml of methylene chloride in a one-neck round-bottom flask fitted with a magnetic stirrer. A solution of 32.0 g (0.2 mole) of bromine in 100 ml of methylene chloride was slowly added to the polymer solution. After this addition was completed, the magnetic stirring bar was removed and the flask transferred to a rotary evaporator. The volatile material was removed at about 50° C. and 40 mm Hg, yielding 28.97 g of a bright orange solid. The flask containing the product was then heated on a steam bath using a nitrogen sweep gas for 2 hours at 100° C. The resulting orange solid weighed 27.95 g and contained 29.2 percent bromine by weight. Liquid nitrogen was poured into the flask to embrittle the material, which was then ground up. Neutron activation analysis showed 25.6 ±0.3 percent bromine. Iodometric titrations of known amounts of the complex with $Na_2S_2O_3$ showed a weight percent of bromine ranging from 15.5 to 16.0, demonstrating that the oxidative properties of the bromine were not lost. The complex had a molar ratio of 2-ethyl-2-oxazoline monomer to bromine of 1.96.

EXAMPLE 4

An aqueous solution of the complex from Example 1 was tested at 4–80 parts per million (ppm) with *E. Coli* bacteria, using a 30-second exposure time. Complete kill was achieved at 40 ppm or above.

EXAMPLE 5

A mixture of 1.7 g of polyisobutylene sulfonyl chloride initiated poly(2-ethyl-2-oxazoline)-7 mer (0.001 mole) and 2 g of iodine was dissolved in methylene chloride and let stand for two hours. The solvent and excess iodine were removed on a rotary evaporator at 10 mm Hg and 80° C. to yield 2.7 g of a solid product. The complex was not soluble in water. A sample titrated with $Na_2S_2O_3$, after the iodine was extracted by stirring and warming with aqueous potassium iodide, contained 28 percent iodine by weight.

EXAMPLE 6

A mixture of 1.0 g dodecylbenzene sulfonyl chloride initiated poly(2-ethyl-2-oxazoline)-5 mer (0.001 mole) and 0.4 g of iodine was dissolved in methylene chloride and left standing overnight. The solvent was evaporated in a nitrogen stream and then on a rotary evaporator at 20–30 mm Hg and 70° C. The complex contained 17 percent iodine by weight.

Examples 5 and 6 show that high molecular weight functionalized oxazoline polymers may also be used as reactants in the novel process. When the oxazoline polymers are modified with hydrophobic groups, this tends to increase the oil solubility of the resulting products, which are then useful as oil-soluble antimicrobials or sanitizing surfactants.

The above examples are merely illustrative of our novel compounds and processes for the preparation and use of same. The examples are not, however, to be construed as limiting.

We claim:

1. A solid complex comprising (a) a poly-2-oxazoline or poly-2-oxazine, and (b) a halogen, interhalogen or pseudo-halogen.

2. The complex defined by claim 1 wherein said poly-2-oxazoline or poly-2-oxazine is a polymer comprising a plurality of ring-opened units of a 2-oxazoline or 2-oxazine monomer corresponding to the formula:

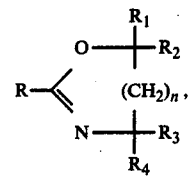

wherein R and $R_1$–$R_4$ are each independently hydrogen, alkyl, aralkyl, phenyl, or inertly-substituted phenyl and n is zero or one.

3. The complex defined by claim 2 wherein $R_1$–$R_4$ are each hydrogen and R is hydrogen, phenyl or lower alkyl.

4. The complex defined by claim 3 wherein (a) is poly(2-ethyl-2-oxazoline).

5. The complex defined by claim 1 wherein (b) is a halogen.

6. The complex defined by claim 5 wherein (b) is iodine or bromine.

7. The complex defined by claim 1 wherein (b) is an interhalogen corresponding to the formula $XX'_n$, wherein X and X' are F, Cl, Br or I, n is an odd numbered integer greater than or equal to one and X' is the lighter halogen atom when n is greater than one.

8. The complex defined by claim 7 wherein (b) is bromine chloride.

9. The complex defined by claim 1 wherein (b) is a pseudo-halogen containing at least two cyano or thiocyano groups.

10. The complex defined by claim 9 wherein (b) is cyanogen or thiocyanogen.

11. The complex defined by claim 2 wherein (a) is poly(2-ethyl-2-oxazoline) having a molecular weight up to about 500,000 and (b) is iodine, bromine or bromine chloride.

12. A process for preparing the complex defined by claim 1 comprising reacting by contacting said halogen, interhalogen or pseudo-halogen and said poly-2-oxazoline or poly-2-oxazine in a liquid substantially non-aqueous organic solvent.

13. The process defined by claim 12 wherein said solvent is methylene chloride.

14. An aqueous solution of the complex defined by claim 1.

* * * * *